No. 689,202. Patented Dec. 17, 1901.
L. L. LA MERE.
BICYCLE ALARM WHISTLE.
(Application filed Apr. 13, 1901.)
(No Model.)
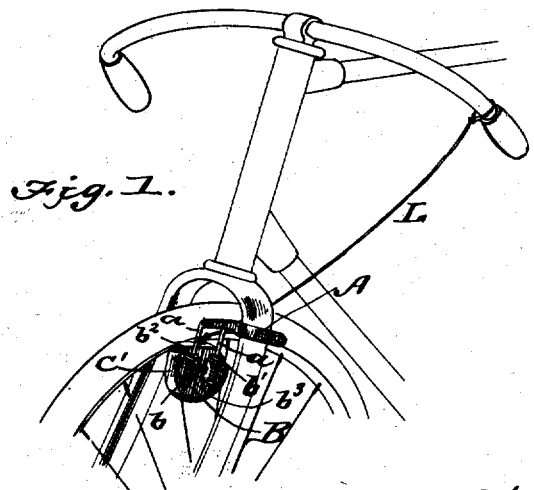
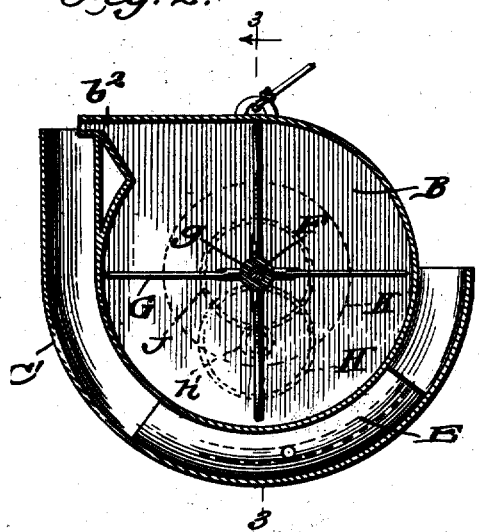
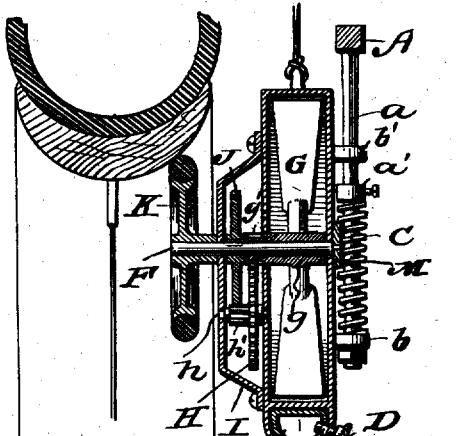
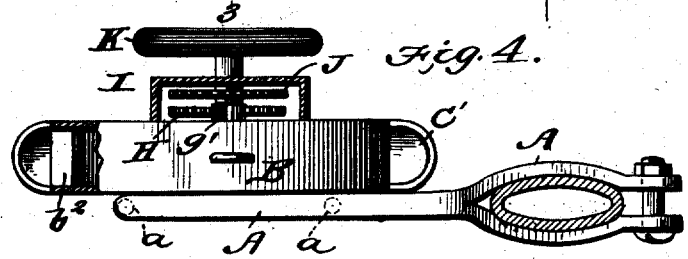
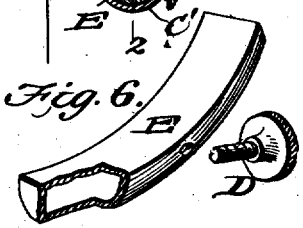
Witnesses
Inventor
Louis L. La Mere.
Attorneys

UNITED STATES PATENT OFFICE.

LOUIS L. LA MERE, OF MOSINEE, WISCONSIN.

BICYCLE ALARM-WHISTLE.

SPECIFICATION forming part of Letters Patent No. 689,202, dated December 17, 1901.

Application filed April 13, 1901. Serial No. 55,695. (No model.)

*To all whom it may concern:*

Be it known that I, LOUIS L. LA MERE, a citizen of the United States, residing at Mosinee, in the county of Marathon and State of Wisconsin, have invented a new and useful Bicycle Alarm-Whistle, of which the following is a specification.

My invention is an improvement in whistles designed especially to be attached to bicycles, and has for its object to provide an alarm arranged on the fork of a bicycle in such position that it may be thrown into engagement with the wheel to sound an alarm to warn a person of the approach of the rider.

A further object of my invention is to provide a whistle having an attachment whereby the tone of the whistle may be readily changed or set to cause a louder or softer tone; and with these objects in view my invention consists in certain new and useful combinations of parts, as will be fully described in the following specification and pointed out in the claims, reference being had to the accompanying drawings, in which—

Figure 1 represents the front portion of a bicycle with my invention applied. Fig. 2 is a detail section taken about on the line 2 2 of Fig. 3. Fig. 3 is a cross-section on the line 3 3 of Fig. 2. Fig. 4 is a plan view with one member of the fork to which my invention is connected shown in section and with parts of the casing also shown in section, and Figs. 5 and 6 are detail views of the construction.

In the drawings, A indicates a bracket that is firmly clamped to one arm of the front fork of a bicycle and having its outer end provided with downwardly-projecting arms $a$, which pass through perforated lugs $b$ and $b'$, formed on the side of the fan-casing B. Spiral springs C are arranged upon the arms $a$, which bear at their upper ends against collars $a'$, held on the arms, and at their lower ends against the lugs $b$, the purpose of which is to normally hold the casing down, as will more fully appear later on.

The casing B is preferably made circular in shape, having one portion of its periphery terminating in an open mouth section $b^2$, that is arranged across the mouth of the whistle-tube $C'$. This tube is secured upon the peripheral surface of the casing and has one side thereof provided with a slot through which passes the shank of a thumb-screw D, which holds a cylindrical plug E, that snugly fits within the tube to any position desired. The purpose of this plug is to change the tone of the whistle, as it will be readily understood that by moving the plug in either direction the tone of the whistle may be changed accordingly. In practice I prefer to make the plug hollow, which lessens the weight, and to make the body somewhat elongated, so that it will cover the slot in the casing no matter to what position it may be placed. It will of course be understood that the plug is to have the same radius as the tube to permit of the adjustment just described.

A shaft F is journaled within the casing, upon which is loosely mounted the hub $g$ of a fan G, having one end formed with a pinion $g'$, that protrudes through an opening formed in one side of the casing and is engaged by a gear-wheel H, journaled on a short shaft $h$ upon the side of the casing, as shown. The outer end of the shaft $h$ is journaled in a bracket I, formed on the side of the casing, which also supports one end of the shaft F.

Formed integral with the gear H is a pinion $h'$, which is engaged by a gear-wheel J, that is keyed upon the shaft F, which latter carries at its outer end a frictional wheel K, that is arranged for engagement with the rim of the front wheel of a bicycle. The normal position of this wheel is down or out of engagement with the wheel of the bicycle, and in order to bring them into engagement I connect to the top of the casing a cord or chain L, that extends up to the handle-bar within easy reach of the rider.

One side of the casing is provided with openings $b^3$, through which air is admitted when the fan is in motion. A plate M is pivoted to the casing for closing the journal of the shaft and is provided with an aperture through which oil is fed to the bearings.

The application and operation of my invention are as follows: The casing is first positioned upon the arms of the bracket and the latter secured to the fork of a bicycle in such position that the frictional wheel is clear of the rim of the bicycle and the cord is connected to the casing and handle. Now when the wheel is in motion and the rider desires to give an alarm he draws upon the cord, which raises the casing against the tension of the springs and brings the frictional wheel into contact with the rim of the bicycle-wheel, which causes the frictional wheel to revolve and through the gears imparts a rapid motion to the fan, which forces air through the mouth of the casing across the top of the tube and produces a whistling sound.

By my invention it will be seen that I provide a simple inexpensive alarm that can be easily applied to a bicycle and one that will produce a sound that can be changed at the will of the rider.

It will of course be understood that when the tension of the cord is released the spring will throw the casing down which causes the frictional wheel to be disengaged from the wheel of the bicycle.

Having thus fully described my invention, what I claim as new, and desire to secure by Letters Patent of the United States, is—

1. In a bicycle-alarm, the combination of a casing, a shaft journaled therein, a fan loosely held upon the said shaft and having its hub provided with a pinion that is adapted for engagement by a gear-wheel carried on a second shaft journaled on the outside of the casing, a pinion formed integral with the gear-wheel, and adapted for engagement with a gear-wheel fixedly held upon the fan-shaft, and means carried by the said fan-shaft for imparting motion to the fan through the medium of the gear wheels and pinions, substantially as shown and described.

2. In a bicycle-alarm, the combination of a fan-casing having a tube arranged integrally on the periphery thereof and having a slot arranged therein, a plug adapted to operate within the tube and having a threaded aperture arranged therein, a thumb-screw projecting through the said slot and adapted to engage the said threaded aperture whereby the said plug may be held to any adjusted position, a fan adapted to operate within the casing, and means for operating the fan substantially as shown and described.

3. In a bicycle-alarm the combination of a fan-casing having a tube arranged on the periphery thereof, a shaft journaled within the casing, a wheel fixedly held on the said shaft, a fan loosely held on the shaft within the casing and having a portion of its hub provided with a pinion, which is adapted for engagement with a gear journaled upon the side of the casing and having a pinion formed therewith that is adapted for engagement with a gear-wheel fixedly held on the shaft upon which the fan is held, and means for revolving the shaft for the purpose shown and described.

LOUIS L. LA MERE.

Witnesses:
WILLIS V. SILVERTHORN,
BYRON F. CLARK.